No. 892,532. PATENTED JULY 7, 1908.
C. E. B. LONG.
RAKE HEAD BAR AND TOOTH.
APPLICATION FILED SEPT. 6, 1907.

2 SHEETS—SHEET 1.

Witnesses
J. Lee Miller
Arthur W. Crossley

Inventor
Charles E. B. Long.
By
Attorneys

No. 892,532. PATENTED JULY 7, 1908.
C. E. B. LONG.
RAKE HEAD BAR AND TOOTH.
APPLICATION FILED SEPT. 6, 1907.

2 SHEETS—SHEET 2.

Witnesses
J. Lee Miller
Arthur W. Crossley

Inventor
Charles E. B. Long
By Chandler & Chandler
Attorneys.

UNITED STATES PATENT OFFICE.

CHARLES E. B. LONG, OF OWENSBORO, KENTUCKY.

RAKE-HEAD BAR AND TEETH.

No. 892,532.　　　Specification of Letters Patent.　　　Patented July 7, 1908.

Application filed September 6, 1907. Serial No. 391,728.

*To all whom it may concern:*

Be it known that I, CHARLES E. B. LONG, a citizen of the United States, residing at Owensboro, in the county of Daviess, State of Kentucky, have invented certain new and useful Improvements in Rake-Head Bars and Teeth; and I do hereby declare the following to be a full, clear, and exact description of the invention, such as will enable others skilled in the art to which it appertains to make and use the same.

It is the object of this invention to provide a rake-head with removable teeth that will be substantial in construction and hence efficient, economical and satisfactory.

The rake is designed for gardening purposes, though its use is not limited.

It is proposed to make the teeth removable, as I shall explain, not only for the purpose of repair but so that a gap, for instance, may be made in the row of teeth in working both sides of a row of plants. A prime purpose, however, is to have the structure substantial and efficient, so that if a tooth becomes broken or impaired it may be well worth while to repair the rake, and not be better to throw it away and get a new one, as is now often the case.

The nature of the invention is fully and clearly ascertainable from the device portrayed in the annexed drawings, forming a part of this specification, in view of which it will first be described with respect to its construction and mode of operation and use, and then be pointed out in the subjoined claims.

Figure 1:
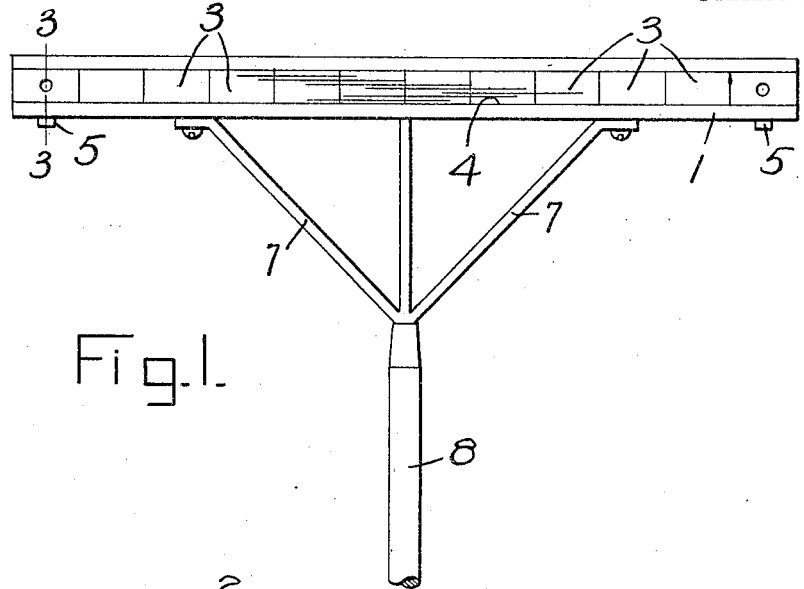
Figure 2:
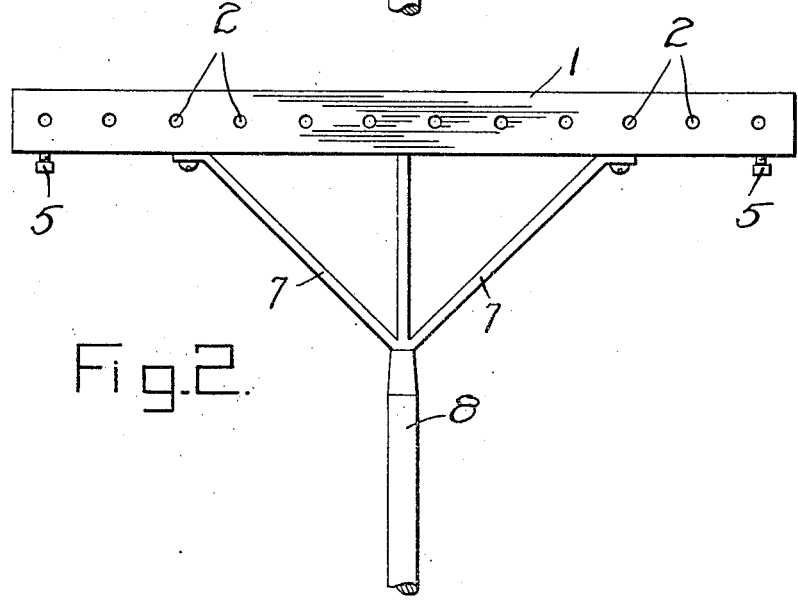
Figure 3:
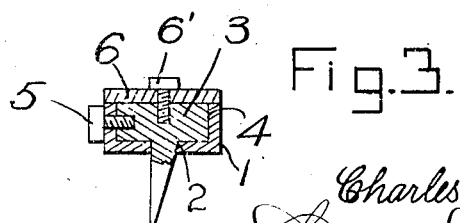
Figure 5:
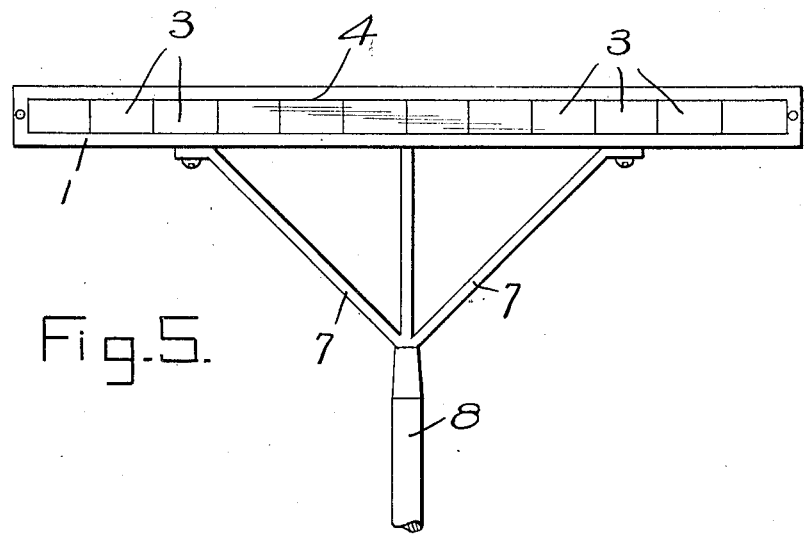
Figure 4:
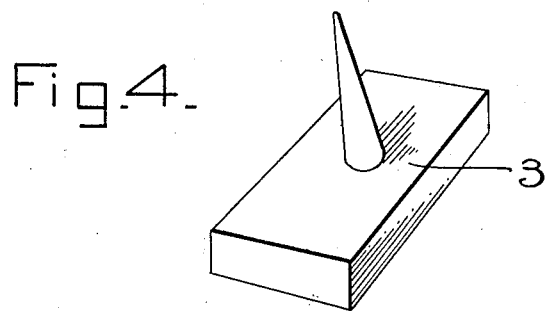
Figure 6:
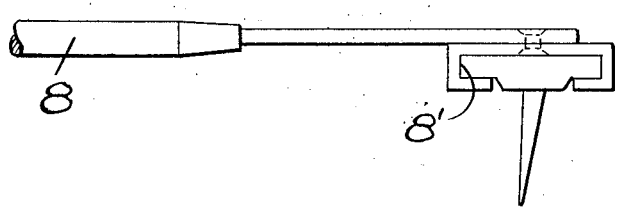

Of the said drawings—Figure 1 is a plan with the top plate removed. Fig. 2 is a bottom view with the teeth represented as removed. Fig. 3 is a cross-section in the plane 3 3, Fig. 1, the top-plate being represented as in place. Fig. 4 is a perspective view of one of the removable teeth and its head. Fig. 5 is a plan of the complete rake, showing a slight modification. Fig. 6 is a side elevation showing another slightly modified form.

Similar characters of reference designate similar parts or features, as the case may be, wherever they occur.

In the drawings, 1 designates the toothbar of the rake-head which is channeled on its upper side the channel being made as wide and deep as is practicable.

Through the bottom of the channel at intervals holes 2 are made for the passage of the teeth which latter are provided with heads 3 constructed to entirely fill the channel 4 from side to side and from top to bottom. The length of the heads 3 is such that their ends will abut against each other, thus filling the channel from end to end.

After the teeth are put in place as shown in Fig. 1, the heads of the end teeth can be secured in place by set screws 5; or when the top plate 6 is placed over the heads in the bar it may have screws 6' tapped through said top plate and into the heads of the end teeth or be fastened in any other suitable way.

The braces 7 and handle 8 may be of any suitable form and construction.

The structure may be made of light steel, wood, or other suitable material; and instead of channeling the top of the bar, as before described the said bar may be made as a channel iron with a closed top and a groove 8' in the bottom, as shown in Fig. 6, in which case the heads of the teeth can be shoved in at the end of the channel-bar the teeth extending through the groove 8'.

It is obvious that the individual teeth can have individual means for holding them in place by means of set screws, as shown in Fig. 1 or any other suitable means, and that one or several teeth can be removed in use of the rake, as before indicated.

The channel bar of the head in connection with the teeth having heads of the general construction and relation explained constitutes my invention, though variations in form and arrangement, as has been instanced by the construction shown in Fig. 6, may be made without departing from the general nature of the invention.

What is claimed is—

A rake-head bar provided with a longitudinal channel combined with rake-teeth having heads formed to fit the channel from side to side and abutting at their ends against each other filling the channel longitudinally.

In testimony whereof, I affix my signature, in presence of two witnesses.

CHARLES E. B. LONG.

Witnesses:
　MARY AUSTIN,
　W. M. O'BRYAN.